(12) United States Patent
Dinan

(10) Patent No.: US 11,690,021 B2
(45) Date of Patent: *Jun. 27, 2023

(54) RESOURCE BLOCKS AND TRANSMIT POWER FOR UPLINK SIGNALS IN A WIRELESS DEVICE

(71) Applicant: Ofinno, LLC, Reston, VA (US)

(72) Inventor: Esmael Hejazi Dinan, McLean, VA (US)

(73) Assignee: Ofinno, LLC, Reston, VA (US)

(*) Notice: Subject to any disclaimer, the term of this patent is extended or adjusted under 35 U.S.C. 154(b) by 38 days.

This patent is subject to a terminal disclaimer.

(21) Appl. No.: 17/213,878

(22) Filed: Mar. 26, 2021

(65) Prior Publication Data

US 2021/0219242 A1 Jul. 15, 2021

Related U.S. Application Data

(63) Continuation of application No. 16/551,026, filed on Aug. 26, 2019, now Pat. No. 10,966,158, which is a continuation of application No. 15/418,917, filed on Jan. 30, 2017, now Pat. No. 10,397,879.

(60) Provisional application No. 62/289,793, filed on Feb. 1, 2016.

(51) Int. Cl.
*H04W 52/14* (2009.01)
*H04W 74/08* (2009.01)
*H04W 72/23* (2023.01)
*H04L 27/26* (2006.01)

(52) U.S. Cl.
CPC ......... *H04W 52/146* (2013.01); *H04W 72/23* (2023.01); *H04W 74/0816* (2013.01); *H04L 27/2601* (2013.01)

(58) Field of Classification Search
CPC .......... H04W 27/2601; H04W 52/146; H04W 72/042; H04W 74/0816
See application file for complete search history.

(56) References Cited

U.S. PATENT DOCUMENTS

| 2016/0050667 A1 | 2/2016 | Papasakellariou et al. |
| 2017/0041805 A1 | 2/2017 | Chandrasekhar et al. |
| 2017/0318607 A1 | 11/2017 | Tirola et al. |
| 2017/0359808 A1 | 12/2017 | Dinan |

(Continued)

OTHER PUBLICATIONS

3GPP TR 36.889 V1.0.1 (Jun. 2015); 3rd Generation Partnership Project; Technical Specification Group Radio Access Network; Study on Licensed-Assisted Access to Unlicensed Spectrum; (Release 13).

(Continued)

*Primary Examiner* — Jamal Javaid
*Assistant Examiner* — Ryan C Kavleski
(74) *Attorney, Agent, or Firm* — Brett K. Gardner; Kavon Nasabzadeh; Jacob L. Mangan

(57) ABSTRACT

A wireless device receives a downlink control information indicating: a transmit power control (TPC) command; and first resource blocks (RBs). A determination is made, based on the TPC command, of a transmission power. The transmission power is used for transmission of: an uplink signal; and one or more transport blocks. A transmission, based on a listen-before-talk (LBT) procedure, is performed with the transmission power and via subcarriers of the first RBs: the uplink signal until a physical uplink shared channel (PUSCH) starting symbol; and the one or more transport blocks starting at the PUSCH starting symbol.

20 Claims, 17 Drawing Sheets

(56) References Cited

U.S. PATENT DOCUMENTS

| | | |
|---|---|---|
| 2017/0366308 A1 | 12/2017 | Choi et al. |
| 2017/0374679 A1 | 12/2017 | Park et al. |
| 2018/0013533 A1 | 1/2018 | Yang et al. |
| 2018/0048498 A1 | 2/2018 | Stern-Berkowitz et al. |
| 2018/0213386 A1 | 7/2018 | Kim et al. |
| 2018/0270757 A1 | 9/2018 | Ahn et al. |

OTHER PUBLICATIONS

3GPP TS 36.211 V13.0.0 (Dec. 2015); Technical Specification; 3rd Generation Partnership Project; Technical Specification Group Radio Access Network; Evolved Universal Terrestrial Radio Access (E-UTRA); Physical channels and modulation (Release 13).
3GPP TS 36.300 V13.2.0 (Dec. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.0.0 (Dec. 2015); 3rd Generation Partnership Project; Technical Specification Group Radio Access Network; Evolved Universal Terrestrial Radio Access (E-UTRA); Medium Access Control (MAC) protocol specification (Release 13).
3GPP TS 36.331 V13.0.0 (Dec. 2015); 3rd Generation Partnership Project; Technical Specification Group Radio Access Network; Evolved Universal Terrestrial Radio Access (E-UTRA); Radio Resource Control (RRC); Protocol specification (Release 13).
3GPP TS 36.213 V13.0.0 (Jan. 2016); Technical Specification; 3rd Generation Partnership Project(3GPP).
3GPP TS 36.212 V13.0.0 (Dec. 2015); 3rd Generation Partnership Project; Technical Specification Group Radio Access Network; Evolved Universal Terrestrial Radio Access (E-UTRA); Multiplexing and channel coding (Release 13).
3GPP TSG RAN WG1 #81; R1-152783; May 25-29, 2015; Fukuoka, Japan; Source: Qualcomm Incorporated; Title: Adaptive Frame Structure and DL-UL configuration for LAA.
3GPP TSG RAN WG1 #81; R1-152786; May 25-29, 2015; Fukuoka, Japan; Source: Qualcomm Incorporated; Title: UE procedure for receiving DL transmissions in LAA.
3GPP TSG RAN WG1 meeting #80bis, R1-151973; Belgrade, Serbia, Apr. 20-24, 2015; Source: Institute for Information Industry (III); Title: On the Design of LAA Uplink Transmission.
3GPP TSG RAN WG1 Meeting #80bis; R1-151627; Belgrade, Serbia, Apr. 20-24, 2015; Source: Samsung; Title: Discussion on UL transmission for LAA.
3GPP TSG RAN WG1 Meeting #80-BIS; R1-151827; Belgrade, Serbia, Apr. 20-24, 2015; Source: Intel Corporation; Title: On the LAA uplink.
3GPP TSG RAN WG1 Meeting #80bis; R1-151302; Belgrade, Serbia; Apr. 20-24, 2015; Source: Huawei, HiSilicon; Title: Support of UL transmission for LAA.
3GPP TSG RAN WG1 meeting #80bis; R1-151516; Belgrade, Serbia, Apr. 20-24, 2015; Source: LG Electronics; Title: LBT operation for LAA UL.
3GPP TSG RAN WG1 Meeting #80bis; R1-151675; Belgrade, Serbia, Apr. 20-24, 2015; Source: Panasonic; Title: Discussion on UL transmission in LAA.
3GPP TSG RAN WG1 Meeting #80bis; R1-151719; Belgrade, Serbia, Apr. 20-24, 2015; Source: ZTE; Title: Potential design for LAA UL transmission.
3GPP TSG RAN WG1 Meeting #81; R1-152872; Fukuoka, Japan, May 25-29, 2015; Source: Samsung; Title: Discussion on UL transmission for LAA.
3GPP TSG RAN WG1 Meeting #81; R1-152649; Fukuoka, Japan, May 25-29, 2015; Source: Intel Corporation; Title: On the LAA UL: LBT, scheduling, and sub-frame structure.
3GPP TSG RAN WG1 Meeting #81; R1-152735; Fukuoka, Japan, May 25-29, 2015; Source: LG Electronics; Title: LBT operation for LAA UL.
3GPP TSG RAN WG1 meeting #81; R1-152736; Fukuoka, Japan, May 25-29, 2015; Source: LG Electronics; Title: Sustained unfairness problem with LBT.
3GPP TSG RAN WG1 Meeting #81; R1-152971; Fukuoka, Japan, May 25-29, 2015; Source: ZTE; Title: Remaining Issues on LAA UL.
3GPP TSG-RAN WG1 #80bis; R1-151750; Belgrade, Serbia, Apr. 20-24, 2015; Source: NVIDIA; Title: Flexible UL-DL transmission for LAA.
3GPP TSG-RAN WG1 Meeting #80bis; R1-151841; Belgrade, Serbia, Apr. 20-24, 2015; Source:Nokia Networks; Title: On the PHY options for LAA UL operation.
3GPP TSG-RAN WG1 Meeting #80bis; R1-151842, Belgrade, Serbia, Apr. 20-24, 2015; Source: Nokia Networks; Title: UL LBT and Configurable Frame Structure for UL/DL operation.
3GPP TSG RAN WG1 #80bis; R1-151404; Apr. 20-24, 2015; Belgrade, Serbia; Source: Qualcomm Incorporated; Title: Adaptive Frame Structure and DL-UL configuration for LAA.

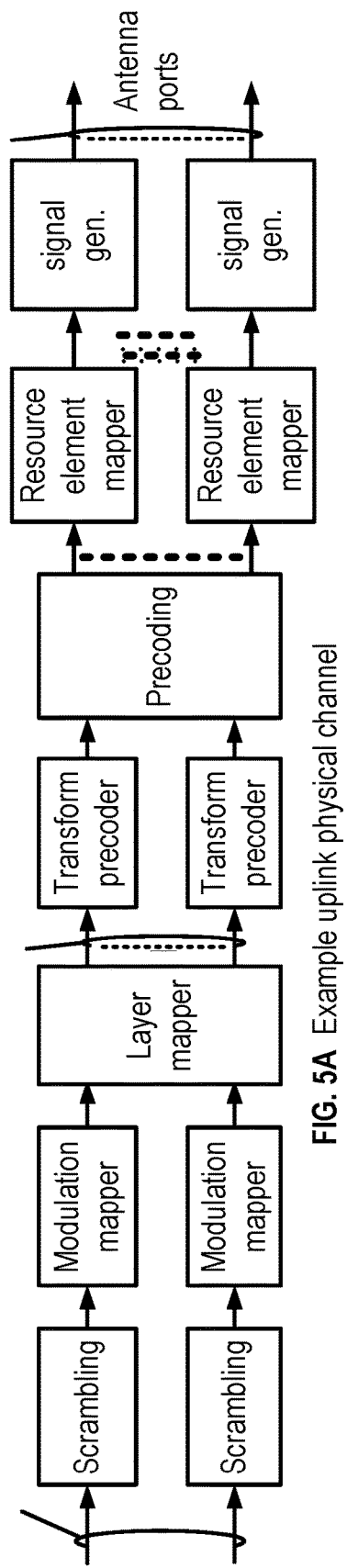
FIG. 5A Example uplink physical channel
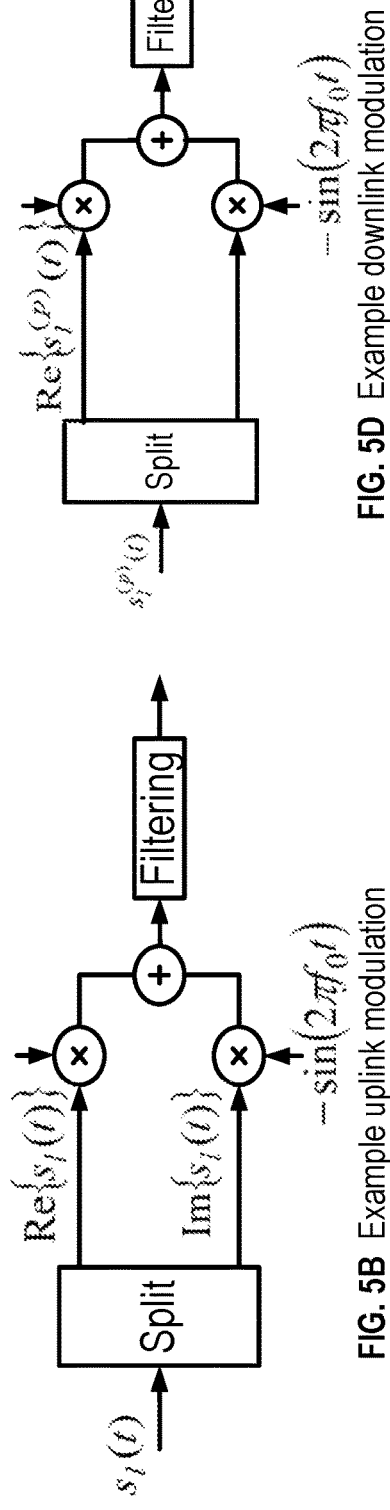
FIG. 5B Example uplink modulation
FIG. 5D Example downlink modulation
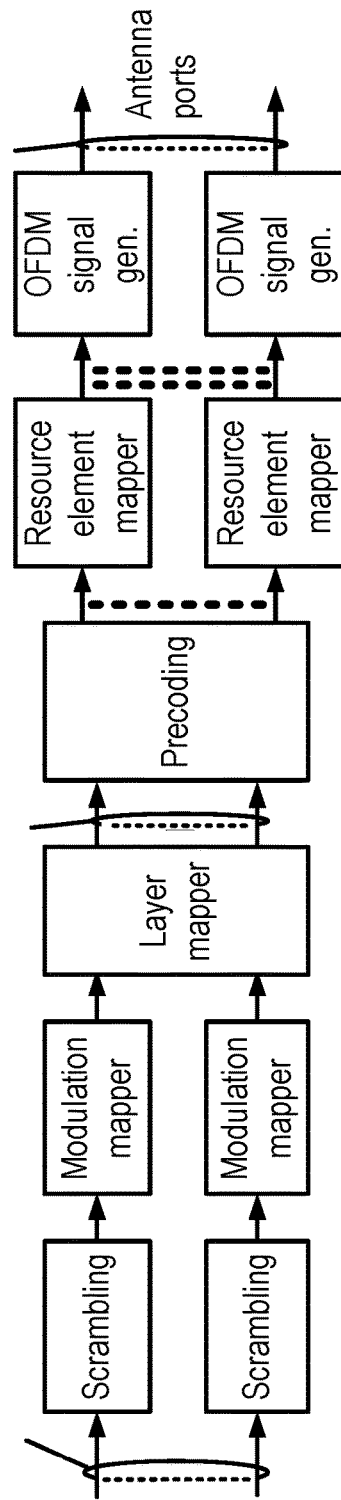
FIG. 5C Example downlink physical channel Dual-Connectivity at eNB FIG. 7 Dual-Connectivity- two MAC entities at UE side

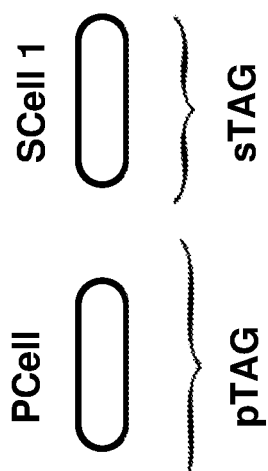
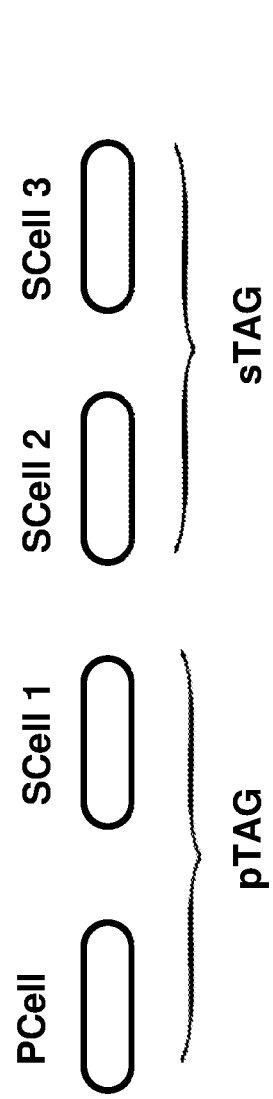
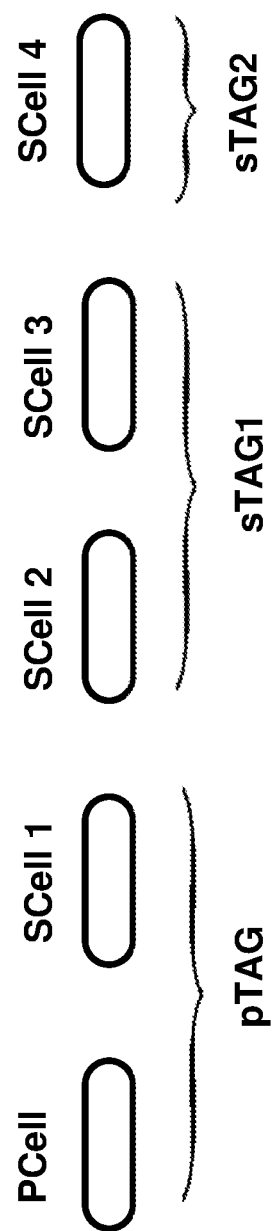
FIG. 8

RESOURCE BLOCKS AND TRANSMIT POWER FOR UPLINK SIGNALS IN A WIRELESS DEVICE

CROSS-REFERENCE TO RELATED APPLICATIONS

This application is a continuation of U.S. patent Ser. No. 16/551,026, filed Aug. 26, 2019, which is a continuation of U.S. patent Ser. No. 15/418,917, filed Jan. 30, 2017, (now U.S. Pat. No. 10,397,879, issued on Aug. 27, 2019), which claims the benefit of U.S. Provisional Application No. 62/289,793, filed Feb. 1, 2016, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

DETAILED DESCRIPTION OF EMBODIMENTS

Figure 1:
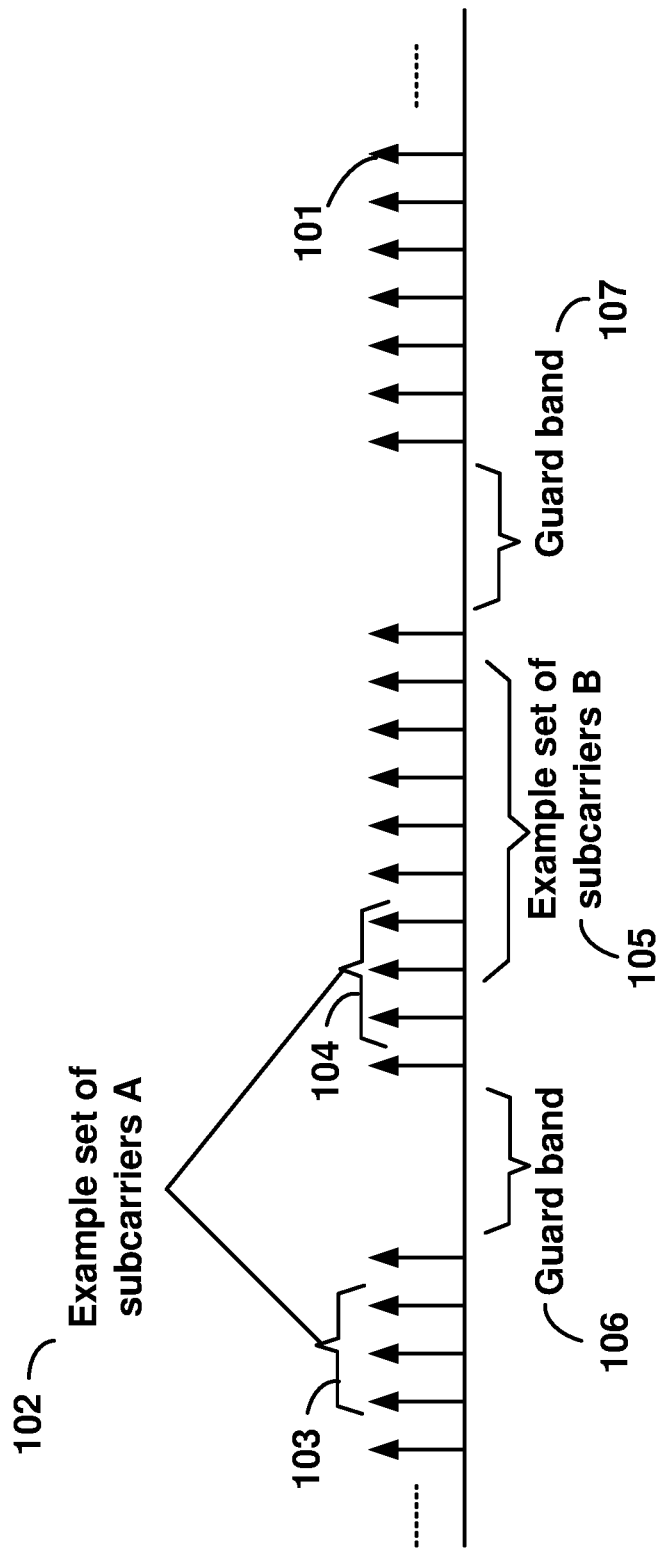
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

| | |
|---|---|
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| DL | downlink |
| DCI | downlink control information |
| DC | dual connectivity |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LAA | licensed assisted access |
| LTE | long term evolution |
| MCG | master cell group |
| MeNB | master evolved node B |
| MIB | master information block |
| MAC | media access control |
| MAC | media access control |
| MME | mobility management entity |
| NAS | non-access stratum |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | Resource Block Groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TB | transport block |

| | |
|---|---|
| UL | uplink |
| UE | user equipment |
| VHDL | VHSIC hardware description language |

Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
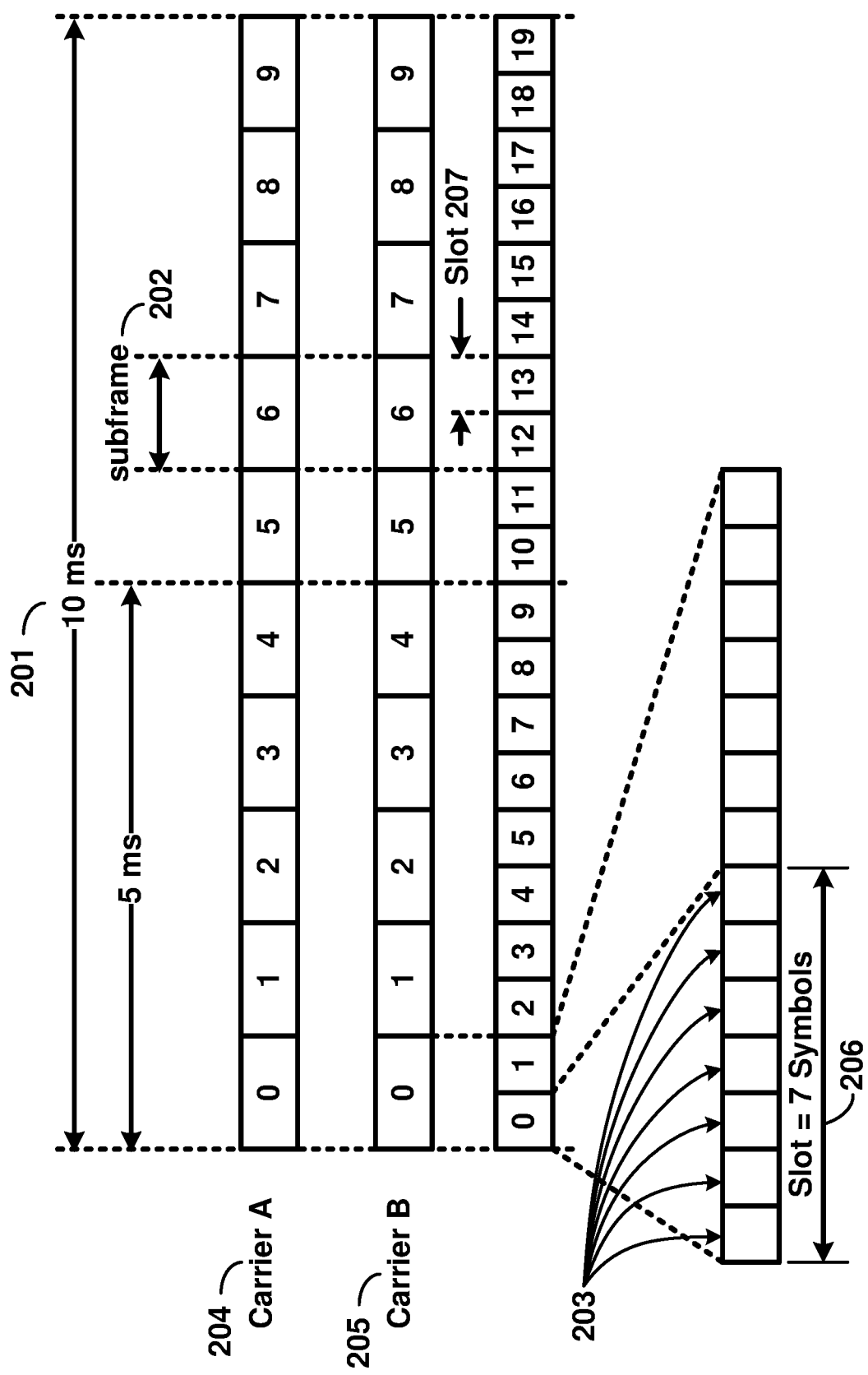
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
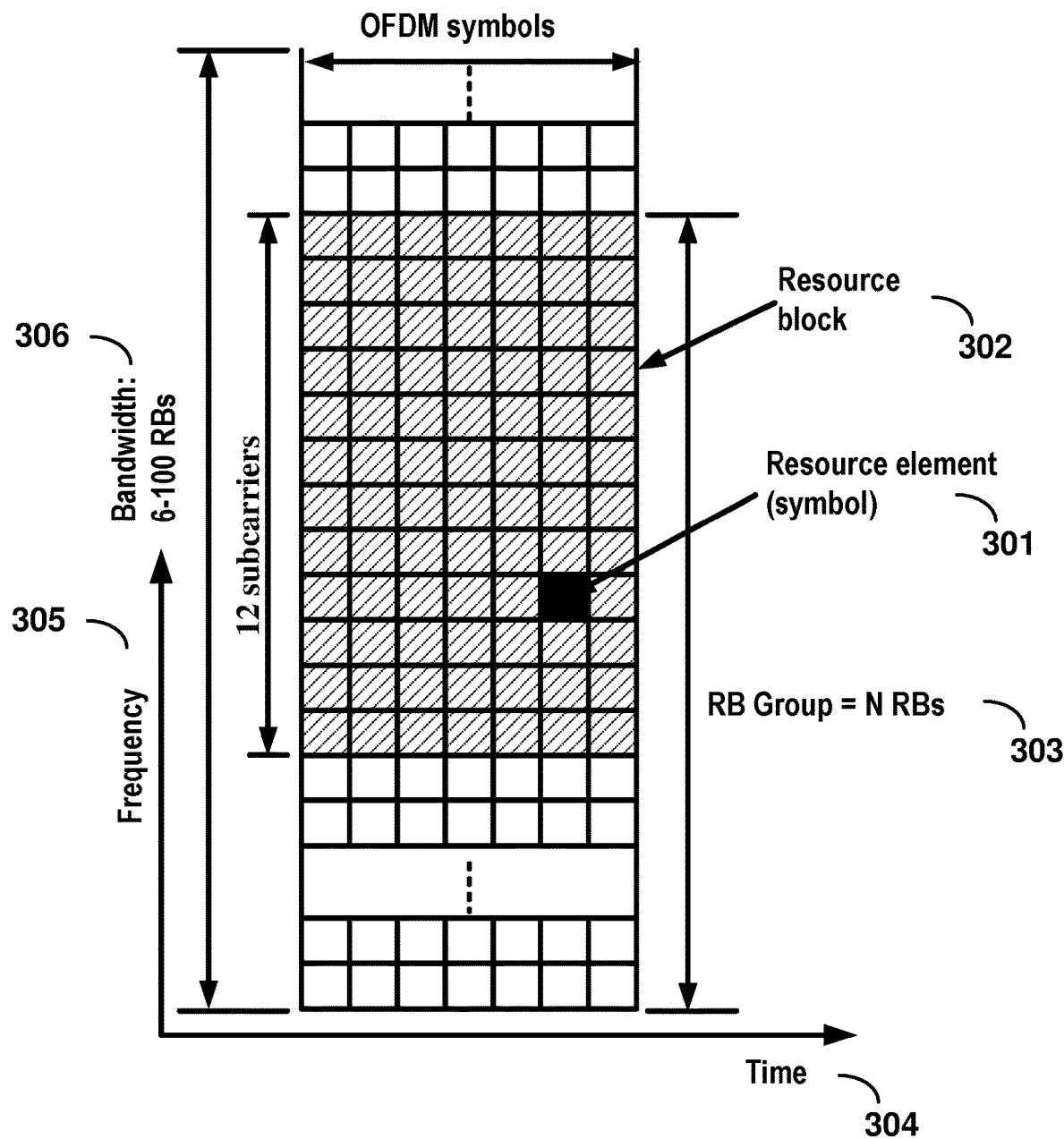
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
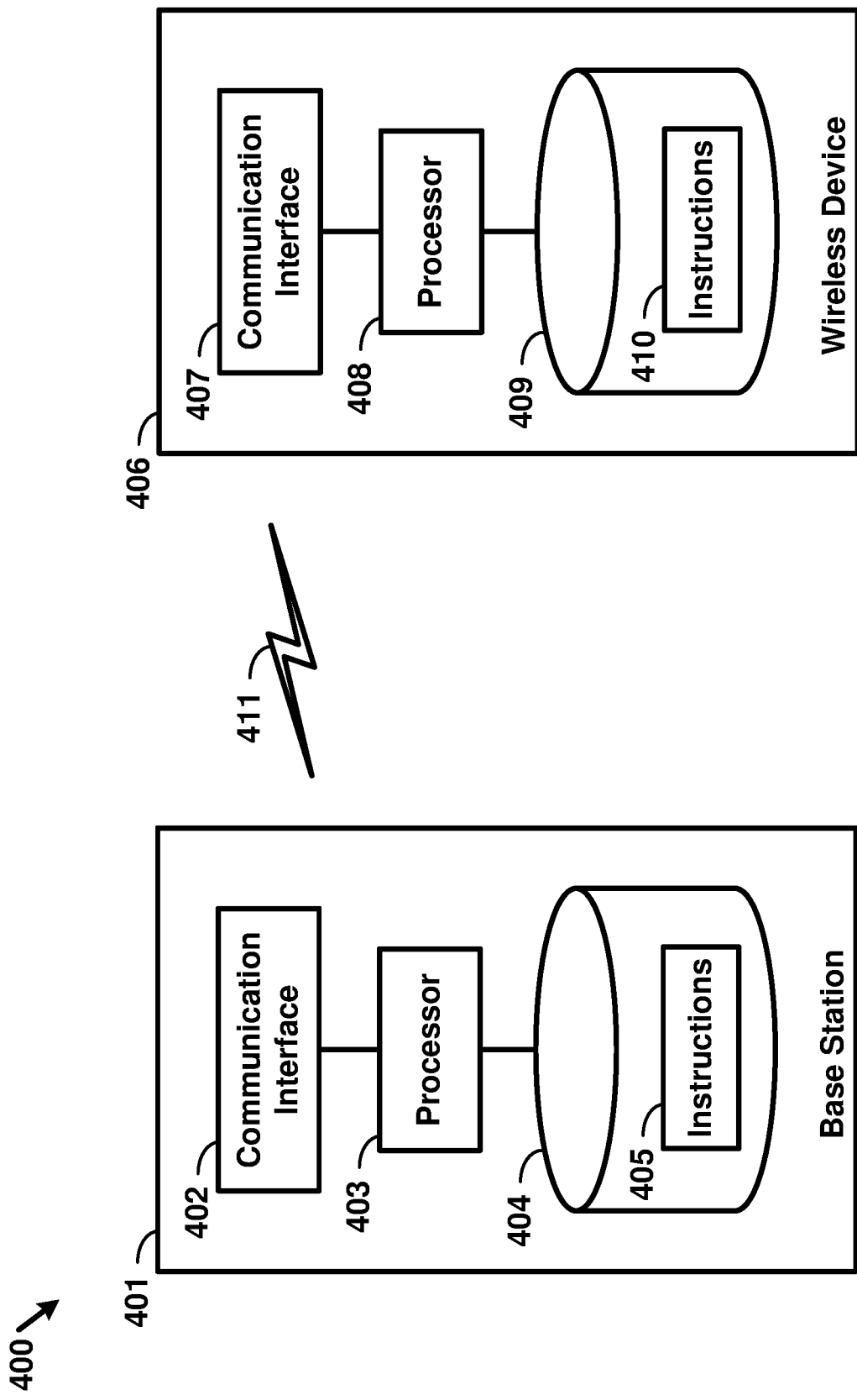
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
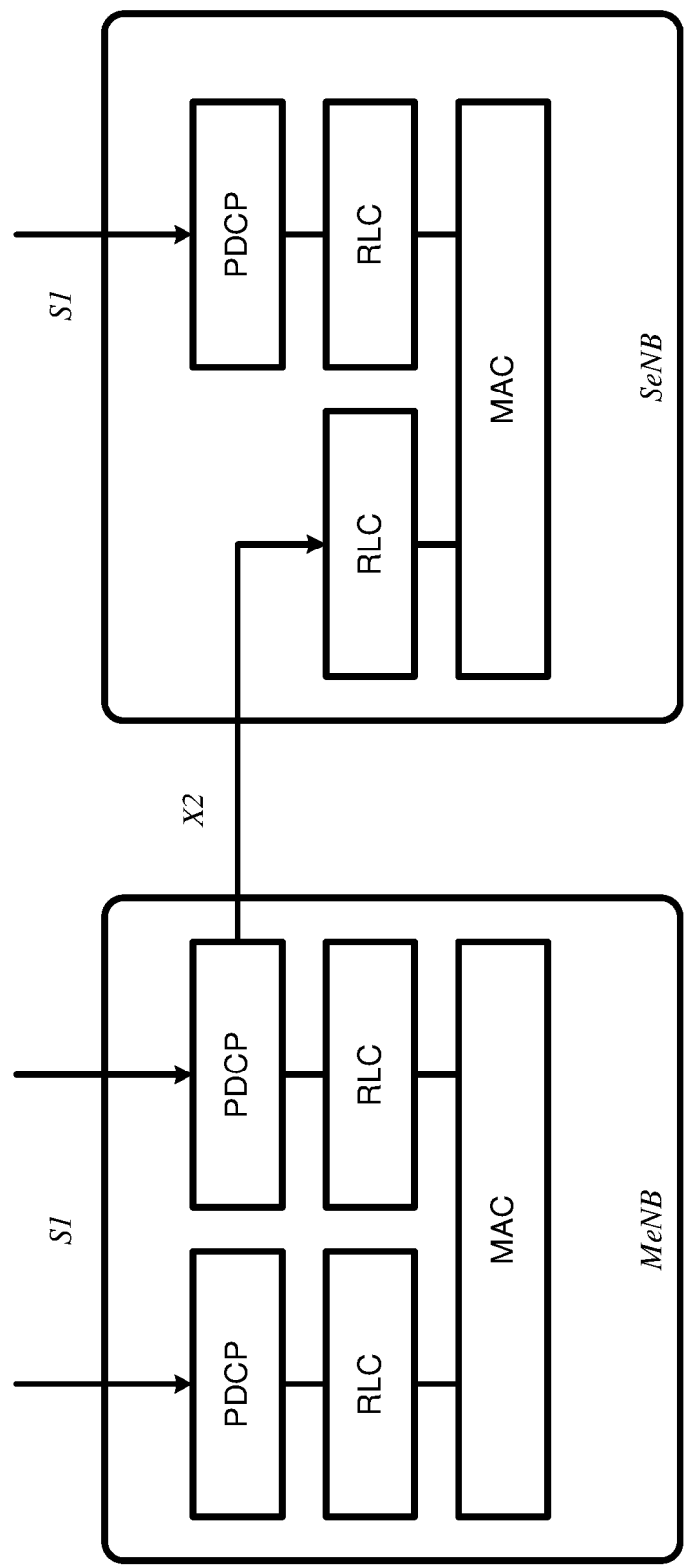
FIG. 6 is an example diagram for a protocol structure with CA and DC as per an aspect of an embodiment of the present disclosure.
Figure 7:
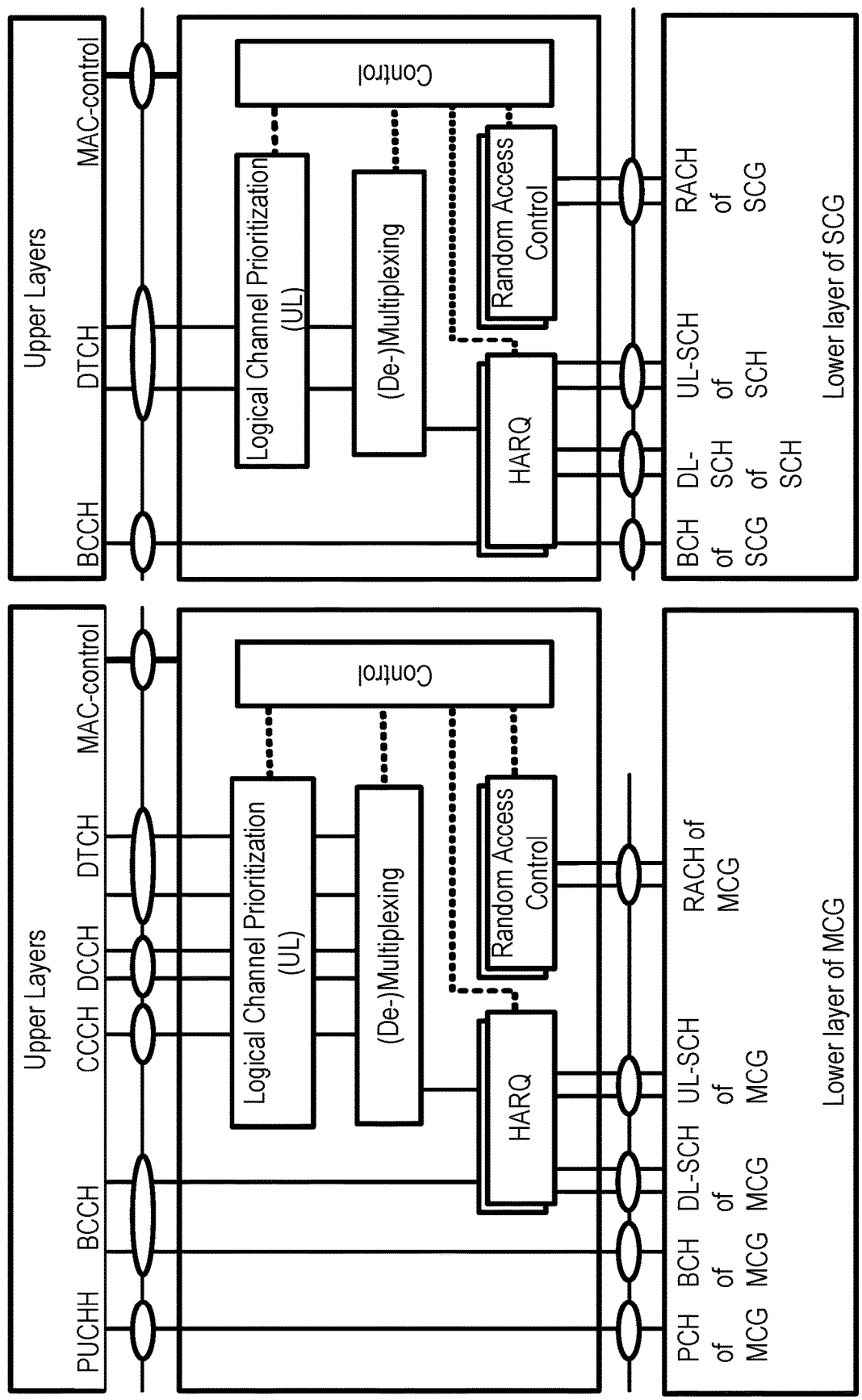
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
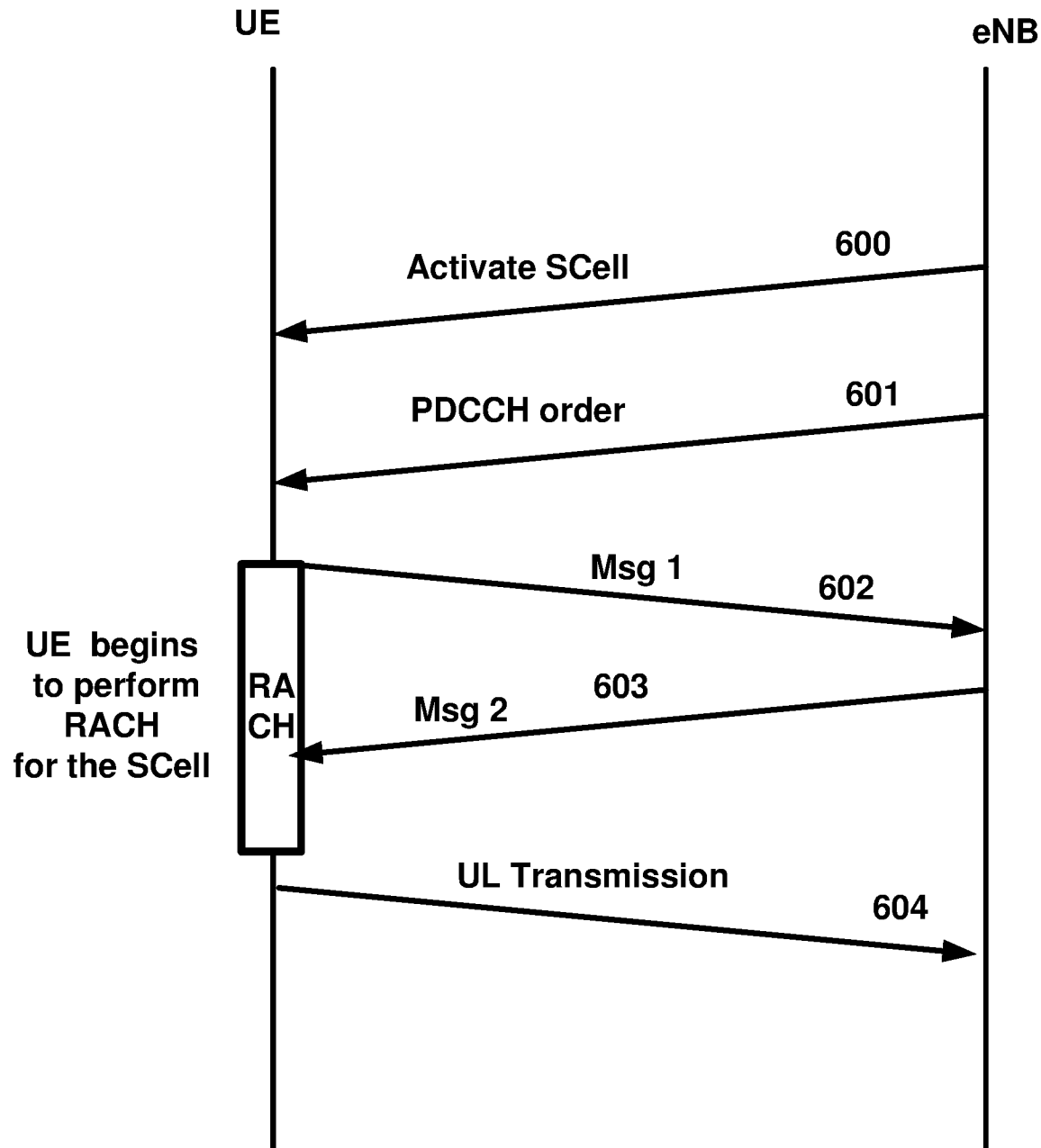
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/orif the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
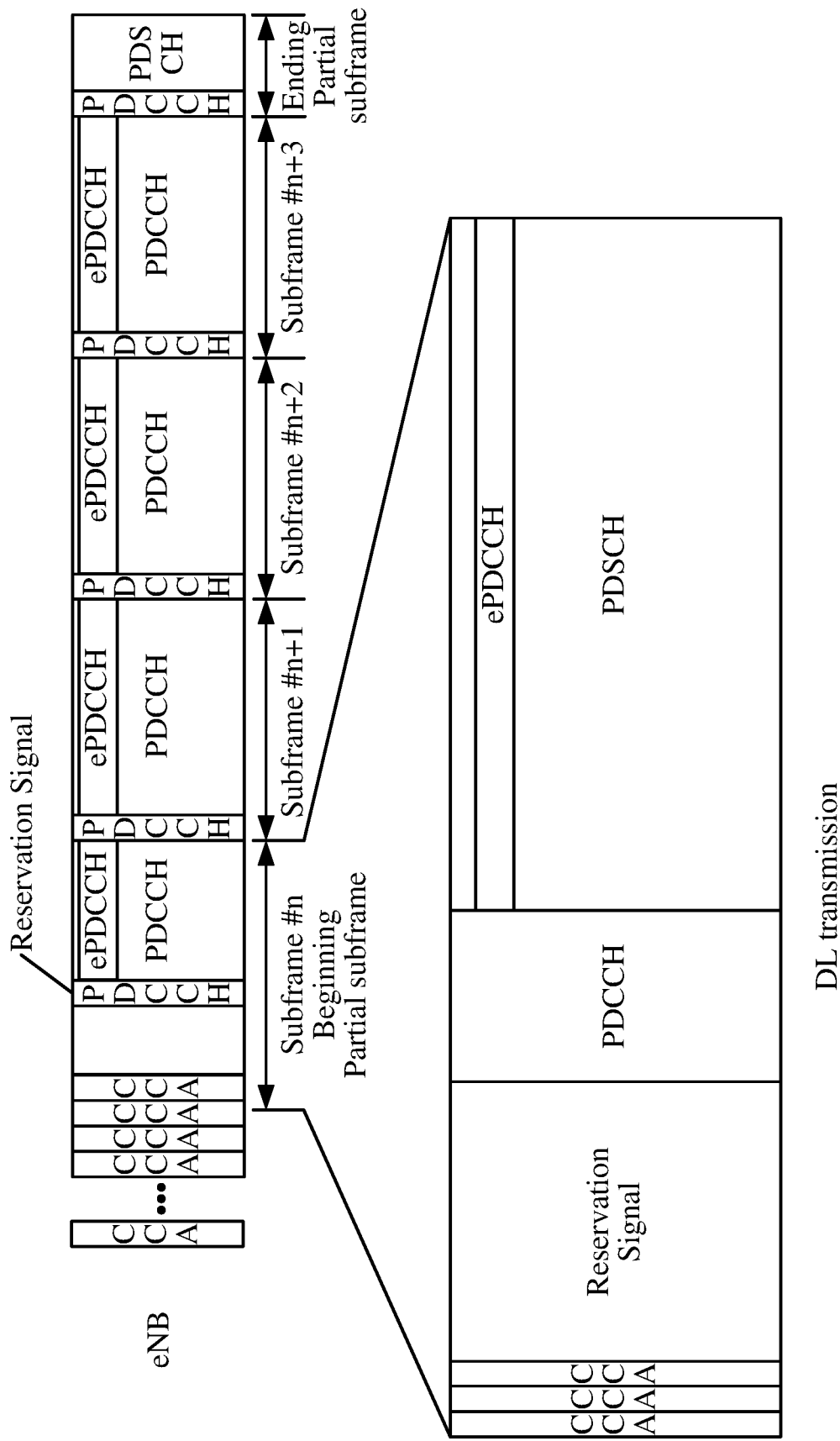
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

Reservation signals may be transmitted prior to transmission of uplink signals such as PUSCH, PUCCH, and/or SRS in the uplink. The format of reservation signals may include SRS signals, DMRS signals, preamble signals, cyclic prefix, PUSCH signal, and/or the like. In an example embodiment, a reservation (R) signal may include information about a UE, an eNB, and/or the like. In an example embodiment, a reservation signal may depend on UE implementation and configuration. For example, a reservation signal may be an extension of the first PUSCH symbol or cyclic prefix. Reservation signals may be transmitted by a UE to reserve uplink channels and reduce the possibility of acquiring the channels by other UEs until the UE transmitting the reservation signal transmits uplink data or other signals. When reservation signals for PUCCH and/or SRS transmission is supported. Reservation signal may be transmitted prior to PUCCH and/or SRS if channel access is required before transmitting the signals. A reservation signal may hold a channel until the upcoming LAA data and/or control signal boundary is reached.

After reception of an UL grant, the UE may perform LBT to detect whether the channel is available for transmission or not. Various implementation options are available for LBT mechanisms for uplink transmission. The UE may transmit reservation signals after LBT is completed until the channel is available for transmission of the desired uplink signals (PUSCH, PUCCH, and/or SRS). Reservation signal may add overhead and interference to the network, but it may increase the probability of channel access. In an example implementation, a reservation signal may include useful data and information for the eNB for channel estimation. Without LBT, PUSCH transmissions may cause collisions with WiFi and other users, and reduce the LAA and WiFi throughput. Transmission of reservation signals after an LBT may reduce the probability of collision and may increase the probability of successful channel access.

In an example embodiment, uplink DM-RS structure or the like (e.g. with different scrambling per symbol) may be used to reserve the channel. In an example implementation, the reservation signal may be transmitted on the RBs allocated to a given UE for uplink PUSCH (or other signals PUCCH and/or SRS) transmissions. The reservation signal bandwidth and format may be designed to increase the possibility of success in channel reservation. The reservation signal may allow the eNB to identify that a UE has obtained channel access. The reservation signal of one or more UEs may be designed to enable frequency and spatial multiplexing of UEs.

In an example implementation, an UL transmission burst from a UE perspective may be a continuous transmission from a UE with no transmission immediately before or after from the same UE on the same CC. An LBT process may be required for an uplink transmission burst. One reservation signal may be required for an uplink transmission burst depending on when the UE determines that the channel is clear. For example, when a UE starts transmitting uplink signals, one reservation signal may be transmitted in the beginning of an uplink transmission burst. The UE may not transmit reservation signals for subframes in the middle of an uplink transmission burst. Transmission of reservation signal may improve uplink performance for LAA cells. In an example implementation, the reservation signal may be transmitted on the RBs allocated to a given UE for uplink PUSCH (or other signals PUCCH and/or SRS) transmissions.

A wireless device may receive one or more messages (e.g. RRC) comprising configuration parameters of an unlicensed cell. The wireless device may receive a downlink control information (DCI) for transmission of one or more transport blocks on the unlicensed cell. The DCI may comprise a transmit power control (TPC) command and/or a resource block assignment indicating a plurality of resource blocks. The wireless device may calculate a transmission power at least employing the TPC command and resource block assignment. The transmission power may be employed for transmission of a reservation signal and a plurality of PUSCH symbols. The wireless device may perform a listen-before-talk (LBT) procedure to detect whether a channel is available for transmission. The wireless device may transmit, in response to the LBT procedure indicating that the channel is available and via a first plurality of RBs and until a physical uplink shared channel (PUSCH) starting symbol, a reservation signal with the transmission power. The wireless device may transmit, via the first plurality of RBs and starting at the PUSCH starting symbol, the one or more transport blocks with the transmission power.

In an example embodiment, the R signal may be transmitted on the RBs allocated to a given UE and may be transmitted at the same power as the UE signal transmission in the same subframe. For example, the UE may adjust R signal power, when the UE adjust PUSCH transmit power in subframe n+1.

Figure 14:
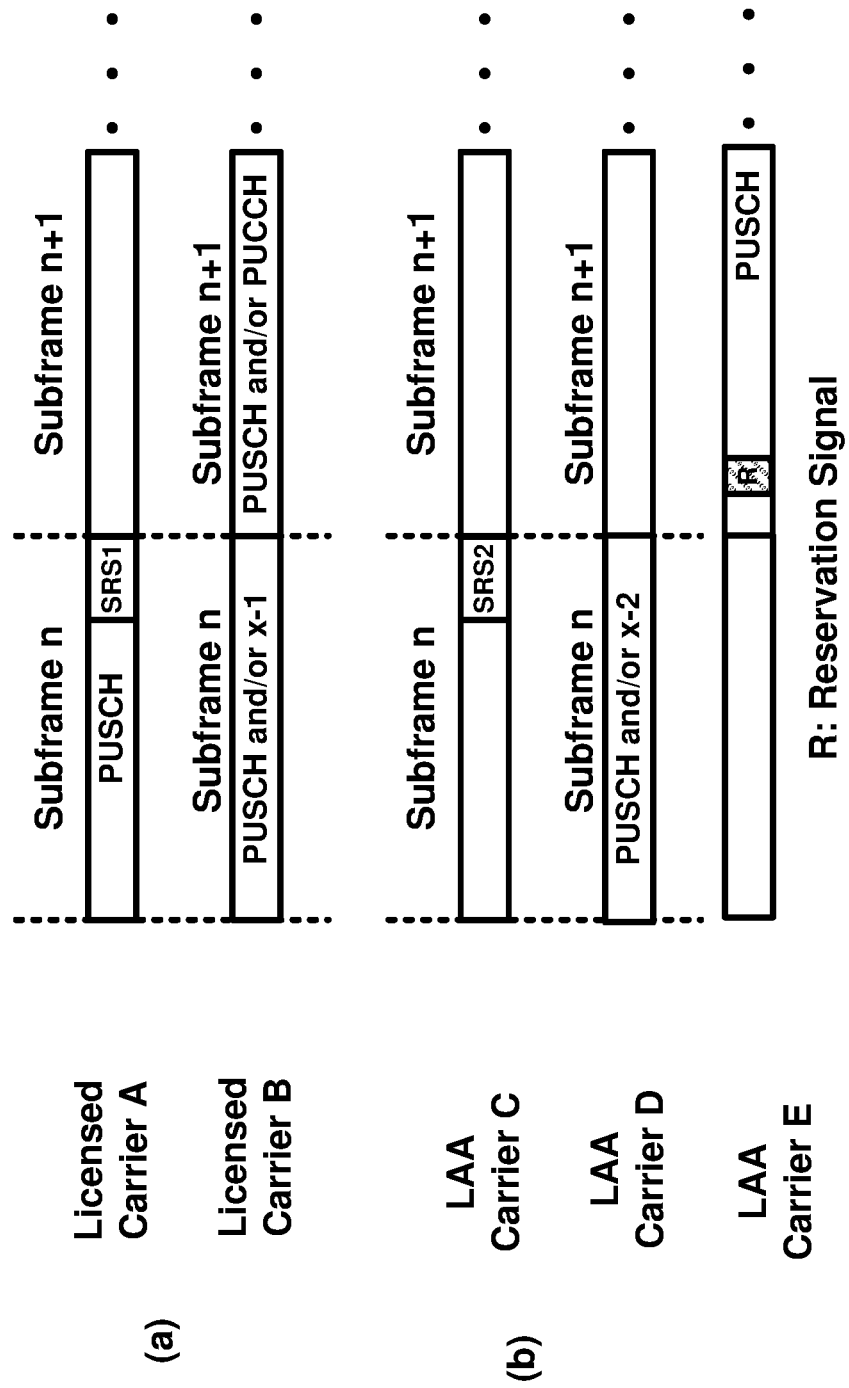
FIG. 14 is an example diagram depicting a plurality of cells as per an aspect of an embodiment of the present disclosure.

When a UE is configured to transmit a reservation signal, the maximum duration, the starting time(s), and/or the ending time of the reservation signal may be specified or configured by eNB. In an example embodiment, an eNB may transmit at least one RRC message comprising one or more parameters indicating possible maximum duration(s), the starting time(s), and/or the ending times for reservation signals in one or more scenarios. Limiting maximum duration of reservation signal may reduce interference and/or channel congestion due to reservation signal. The UE may transmit reservation signals after LBT is completed and until transmission of PUSCH symbols start. In an example embodiment, as shown in FIG. 14, PUSCH (and or other signals e.g. PUCCH) signal transmission may start from a starting symbol different from symbol zero in a subframe.

Example embodiments provide mechanisms for determining a transmission power and radio resources for transmission of a reservation signal. Reservation signals are transmitted with the same power of the following PUSCH symbols and are transmitted in the same resource blocks as the following PUSCH RBs. Example embodiment enhances LAA operation, channel reservation and signal transmission and enables multiple UEs to transmit signal in the same subframe to an eNB.

LTE rlease-13 UL power control mechanisms may be enhanced for transmission signals in the uplink of an LAA cell. LTE UL power control may reduce a UE transmission power as long as the reception performance at eNB satisfies the requirement. The eNB may transmit TPC for uplink transmission. In an example uplink transmission in an LAA cell with LBT operation in the LAA cell, a UE transmission power may be employed by other wireless devices within certain coverage to prevent uplink transmission by other nodes and creating interference.

Uplink power control may reduce UL transmit power to a relatively low level. Uplink transmit power of below a threshold may not be suitable for LAA operation on an unlicensed carrier. Enhancement of UL power control algorithms suitable for LBT operation may be considered. In an example embodiment, a UE's minimum transmit power may be configured (via RRC messages) to reduce the possibility of other UEs detecting the channel free and start transmission and interfering with the UE. A UE may be configured to transmit above a minimum transmit power value even if the eNB may detect its signal at below the minimum value.

In an example scenario, in an LAA cell, a maximum transmit power spectral density may be limited, e.g. the power limit may depend on transmission bandwidth. Maximum allowed transmission power may depend on transmission bandwidth. The power control in the current LTE systems may limit maximum total output power of a UE via configurable maximum transmit power PCMAX independent of transmission bandwidth (the number of RBs used for uplink transmission). The current LTE systems do not provide a capability for configuration of maximum power depending based on the uplink transmission bandwidth (the number of RBs in an uplink transmission). Enhancements may be considered to control the maximum transmit power spectral density of a UE in an unlicensed band. Mechanisms may be implemented to allocate UEs transmit power between different cells including licensed cell and LAA cells, e.g. when the UE is power limited.

In an example embodiment, a UE may calculate transmit power for PUSCH, PUCCH, and/or SRS in the uplink according to a power control formula. The calculations of uplink transmit power for a signal may employ uplink power calculations in release 13 with additional enhancements to improve uplink transmission power for LAA cells.

Uplink transmission power of PUSCH, PUCH, and/or SRS may be adjusted (scaled down) when uplink transmit power of serving cells exceed maximum transmit power of the UE. For example, In FIG. 11, powers may be calculated for uplink signals (e.g. PUSCH and/or PUCCH) on carriers B and E in subframe n+1. If a total maximum calculated transmit power does not exceed the max transmit power of the UE, the UE may transmit signals on carriers B and E according to the calculated power. If the total maximum calculated transmit power exceed the max transmit power of the UE, the UE may transmit signals on carriers B and E according to a predefined rule by adjusting (scaling) the transmission power. In such conditions, the UE may drop one or more signals, and transmit one or more other signals to meet the power requirements. In an example embodiment, SRS signals may be dropped if SRS signals cannot be transmitted in parallel with PUSCH and/or PUCCH signals in a cell group (MCG, SCG).

Example power control formulas for calculating the power of PUSCH, PUCCH and SRS in different scenarios are presented below. In an example, some enhancements may be made to power control mechanisms to improve power control efficiency in an LAA cell.

In an example implementation, the setting of the UE Transmit power for a Physical Uplink Shared Channel (PUSCH) transmission may be determined as follows.

If the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \alpha_c(j) \cdot PL_c + \\ \Delta_{TF,c}(i) + f_c(i) \end{array}\right\} [dBm]$$

If the UE transmits PUSCH simultaneous with PUCCH for the serving cell c, then the UE may transmit power $P_{PUSCH,c}(i)$ for the PUSCH transmission in subframe i for the serving cell c may be given by $$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \\ \Delta_{TF,c}(i) + f_c(i) \end{array}\right\} [dBm]$$

If the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c may be computed by $$P_{PUSCH,c}(i) = \min\{P_{CMAX,c}(i), P_{O\_PUSCH,c}(1) + \alpha_c(1) \cdot PL_c + f_c(i)\} [dBm]$$

In an example implementation, if serving cell e is the primary cell, for PUCCH format 1/1a/1b/2/2a/2b/3, the setting of the UE Transmit power $P_{PUCCH}$ for the physical uplink control channel (PUCCH) transmission in subframe i for serving cell c may be determined by $$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \\ \Delta_{T\times D}(F') + g(i) \end{array}\right\} [dBm]$$

If serving cell e is the primary cell, for PUCCH format 4/5, the setting of the UE Transmit power $P_{PUCCH}$ for the physical uplink control channel (PUCCH) transmission in subframe i for serving cell c may be determined by $$P_{PUCCH}(i) = \min\left\{\begin{array}{l} P_{CMAX,c}(i), \\ P_{0\_PUCCH} + PL_c + 10\log_{10}(M_{PUCCH,c}(i)) + \Delta_{TF,c}(i) + \\ \Delta_{F\_PUCCH}(F) + g(i) \end{array}\right\} [dBm]$$

If the UE is not transmitting PUCCH for the primary cell, for the accumulation of TPC command for PUCCH, the UE may assume that the UE transmit power $P_{PUCCH}$ for PUCCH in subframe i is computed by $$P_{PUCCH}(i)=\min\{P_{CMAX,c}(i),P_{0\_PUCCH}+P_c+g(i)\}$$
[dBm]

In an example implementation, the setting of the UE Transmit power $P_{SRS}$ for the SRS transmitted on subframe i for serving cell c may be determined by $$P_{SRS,c}(i)=\min\{P_{CMAX,c}(i),S_{SRS\_OFFSETc}(m)+10\log_{10}(M_{SRS,c})+P_{O\_PUSCH,c}(j)+\alpha_c(j)\cdot PL_c+f_c(i)\}$$ [dBm]

There is a need to determine the transmit power of R signals in an LTE network. Example embodiments present a mechanism for determining the power of reservation (R) signals in the uplink. Reservation signals may play an important role in uplink transmission, and transmission power for R signals may be determined by the UE. There is a need to develop mechanisms for determining the transmit power of R signals in different transmission scenarios.

Figure 12:
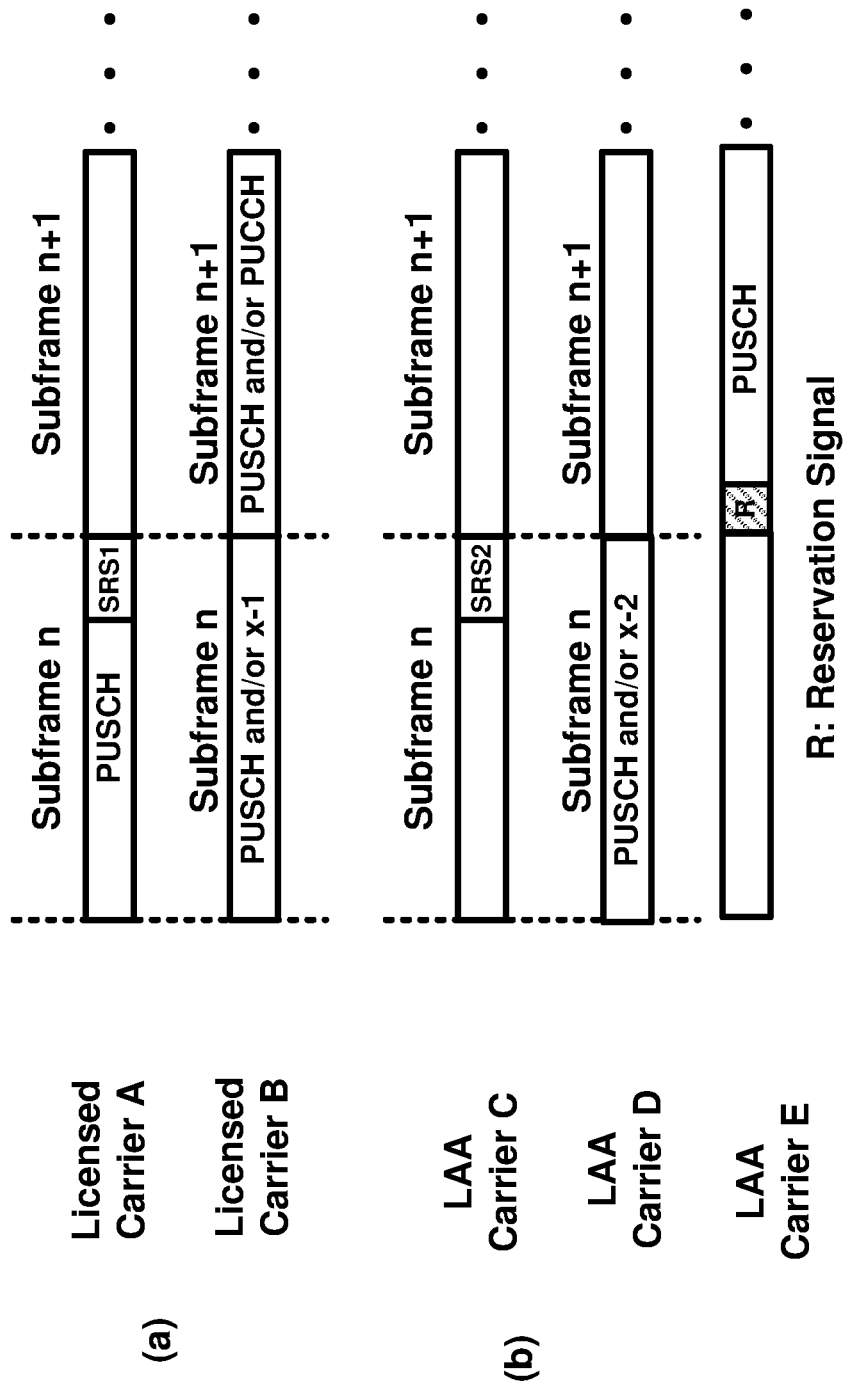
FIG. 12 is an example diagram depicting a plurality of cells as per an aspect of an embodiment of the present disclosure.

In an example embodiment, when the R signals are transmitted in the same subframe as the first uplink transmission, uplink transmit power of R signals may be determined based on the power calculations for the first uplink transmission. For example, in FIG. 12 and FIG. 14, the uplink transmit power of the R signal in subframe n+1 may depend on uplink power calculations for PUSCH in subframe n+1. In an example embodiment, the UE may calculate a first transmit power of PUSCH according to a first mechanism (e.g. a formula). The UE signal transmit power (e.g. PUSCH on carrier E in subframe n+1) may then be adjusted to a second transmit power if the total transmit power of the UE exceeds the maximum allowed transmit power of the UE in subframe n+1.

In an example embodiment, the R signal may be transmitted on the RBs allocated to a given UE and may be transmitted at the same power as the UE signal transmission in the same subframe. For example, the UE may adjust R signal power, when the UE adjust PUSCH transmit power in subframe n+1.

In an example embodiment, as shown in FIG. 14, PUSCH (and or other signals e.g. PUCCH) signal transmission may start from a starting symbol different from symbol zero in a subframe, for example from the first symbol of the second slot. The transmit power of the PUSCH (and or other signals, e.g. PUCCH) on serving cells transmitting uplink signals may be determined for the entire subframe. In an example embodiment, the UE may not be power limited in the first slot (or a first duration), but may be power limited in the second slot (or second duration) of subframe n+1. The UE may adjust one or more transmit powers of signals transmitted in one or more carriers in the entire subframe n+1 to meet power requirements in the first and second slot of subframe n+1.

In an example embodiment, Power priority of the R signal may be considered to be the same as the power priority of the signal following the R signal, when R signal and the following signals are transmitted in the same subframe. When the following signal power (e.g. PUSCH power) is adjusted, the R signal power is adjusted as well. The same adjusting factor may be applied to the following signal power as well as the R signal power.

In an example, if the UE is not configured with an SCG or a PUCCH-SCell, and if the total transmit power of the UE would exceed $\hat{P}_{CMAX}(i)$, the UE may scale $\hat{P}_{PUSCH,c}(i)$ for the serving cell c in subframe i such that the condition $$\sum_c w(i) \cdot \hat{P}_{PUSCH,c}(i) \le (\hat{P}_{CMAX}(i) - \hat{P}_{PUCCH}(i))$$

is satisfied where $\hat{P}_{PUCCH}(i)$ is the linear value of $P_{PUCCH}(i)$, $\hat{P}_{PUSCH,c}(i)$ is the linear value of $P_{PUSCH,c}(i)$ $\hat{P}_{CMAX}(i)$ is the linear value of the UE total configured maximum output power $P_{CMAX}$ in subframe i and w(i) is a scaling factor of $\hat{P}_{PUSCH,c}(i)$ for serving cell c where $0 \le w(i) \le 1$. In case there is no PUCCH transmission in subframe i $\hat{P}_{PUCCH}(i)=0$.

In an example, if the UE is not configured with an SCG or a PUCCH-Scell, and if the UE has PUSCH transmission with UCI on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe i such that the condition $$\sum_{c \ne j} w(i) \cdot \hat{P}_{PUSCH,c}(i) \le (\hat{P}_{CMAX}(i) - \hat{P}_{PUSCH,j}(i))$$

is satisfied where $\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling is applied to $\hat{P}_{PUSCH,j}(i)$ unless $$\sum_{c \ne j} w(i) \cdot \hat{P}_{PUSCH,c}(i) = 0$$

and the total transmit power of the UE still would exceed $\hat{P}_{CMAX}(i)$.

For a UE not configured with a SCG or a PUCCH-SCell, w(i) values may be the same across serving cells when w(i)>0 but for certain serving cells w(i) may be zero.

If the UE is not configured with an SCG or a PUCCH-SCell, and if the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$P_{PUSCH,j}(i)=\min(\hat{P}_{PUSCH,j}(i),(\hat{P}_{CMAX}(i)-\hat{P}_{PUCCH}(i)))$$

and $$\sum_{c \ne j} w(i) \cdot \hat{P}_{PUSCH,c}(i) \le (\hat{P}_{CMAX}(i) - \hat{P}_{PUCCH}(i) - \hat{P}_{PUSCH,j}(i))$$

In an example embodiment, if the UE is not configured with a SCG or a PUCCH-SCell, the following example implementations may be implemented.

In an example, if the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG the UE may adjust its total transmission power to not exceed $P_{CMAX}$ on any overlapped portion.

In an example, if the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG the UE may adjust its total transmission power to not exceed $P_{CMAX}$ on any overlapped portion.

In an example, if the UE is configured with multiple TAGs, and if the SRS transmission of the UE in a symbol on subframe i for a given serving cell in a TAG overlaps with the PUCCH/PUSCH transmission on subframe i or subframe i+1 for a different serving cell in the same or another TAG the UE may drop SRS if its total transmission power exceeds $P_{CMAX}$ on any overlapped portion of the symbol.

In an example, if the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s) the UE may drop the SRS transmissions if the total transmission power exceeds $P_{CMAX}$ on any overlapped portion of the symbol.

In an example, if the UE is configured with multiple TAGs, the UE shall, when requested by higher layers, to transmit PRACH in a secondary serving cell in parallel with SRS transmission in a symbol on a subframe of a different serving cell belonging to a different TAG, drop SRS if the total transmission power exceeds $P_{CMAX}$ on any overlapped portion in the symbol.

In an example, if the UE is configured with multiple TAGs, the UE may, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

In an example embodiment, when the R signals are transmitted in a preceding subframe (in subframe n) of the first uplink transmission (in subframe n+1), uplink transmit power of R signals may be determined based on the power calculations for the first uplink transmission. For example in FIG. 11, the uplink transmit power of the R signal in subframe n+1 may depend on uplink power calculations for PUSCH in subframe n+1. In an example embodiment, the UE may calculate a first transmit power of PUSCH according to a first mechanism (e.g. power control formula). The UE may transmit PUSCH with the first transmit power.

In an example, the UE signal transmit power (e.g. PUSCH on carrier E in subframe n+1) may be adjusted if the total transmit power of the UE exceeds the maximum allowed transmit power of the UE in subframe n+1 to obtain a second transmit power. The UE signal may be transmitted with the second transmit power.

In an example, the first calculated power for subframe n+1 may be the baseline power for determining R transmit power in subframe n. In an example, the second transmit power (adjusted power) may be the baseline power for determining R transmit power in subframe n.

The UE may determine a first R transmit power. In an example, the R signal may be transmitted on the RBs allocated to a given UE and may be transmitted at the baseline power. In an example embodiment, the R signal may be transmitted on RBs different from the RBs allocated to a given UE and may be transmitted at the baseline power.

In an example, R signal power adjustment in the preceding subframe may be implemented. The signals transmitted on multiple carriers in subframe n may be different from signals transmitted in subframe n+1. In an example scenario, the UE may be power limited in subframe n+1, and may not be power limited in subframe n. In an example scenario, the UE may not be power limited in subframe n, and may be power limited in subframe n+1. In an example scenario, the UE may be power limited in both subframe n and n+1. In an example scenario, the UE may not be power limited in either subframe n or n+1.

Figure 11:
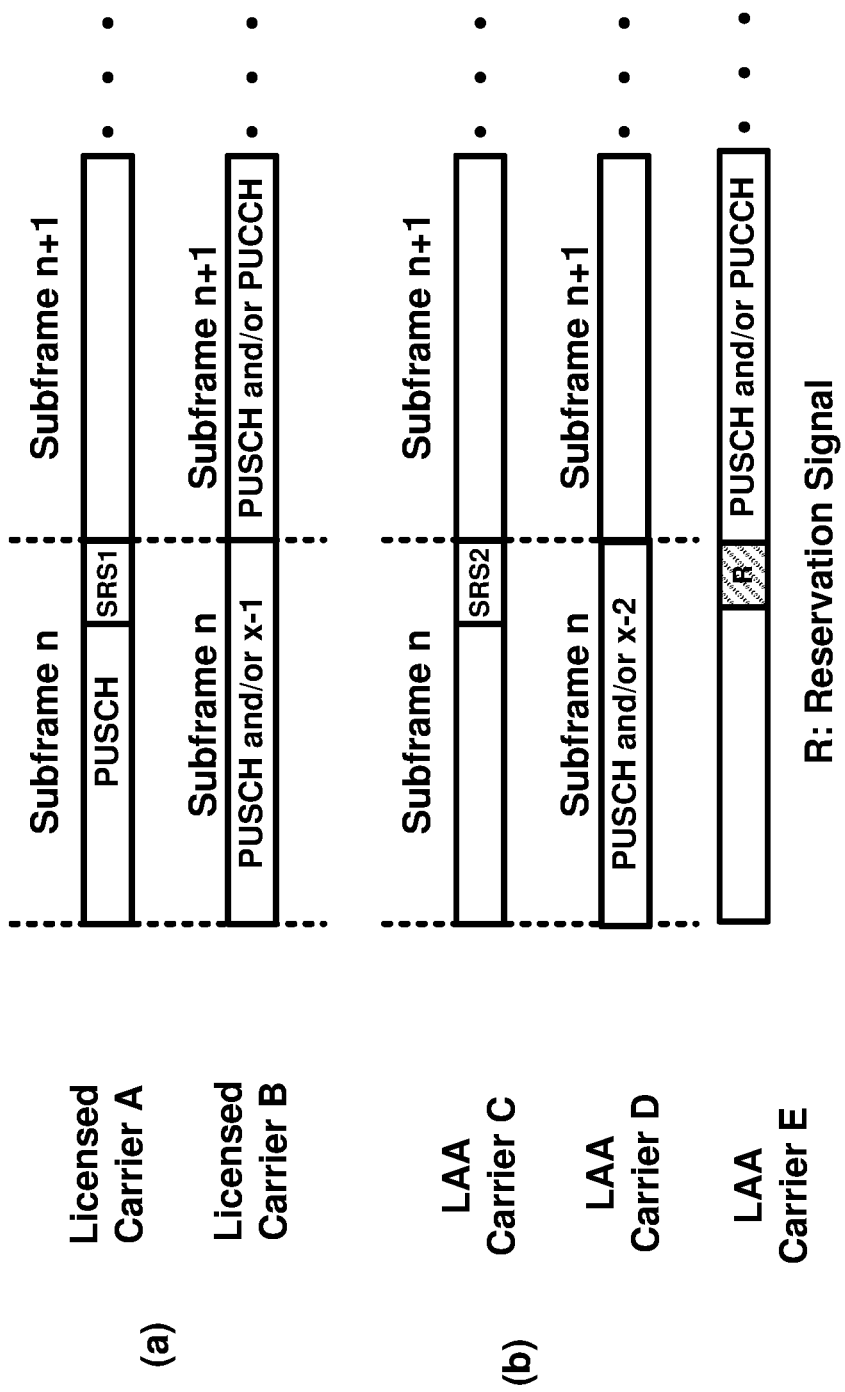
FIG. 11 is an example diagram depicting a plurality of cells as per an aspect of an embodiment of the present disclosure.
Figure 13:
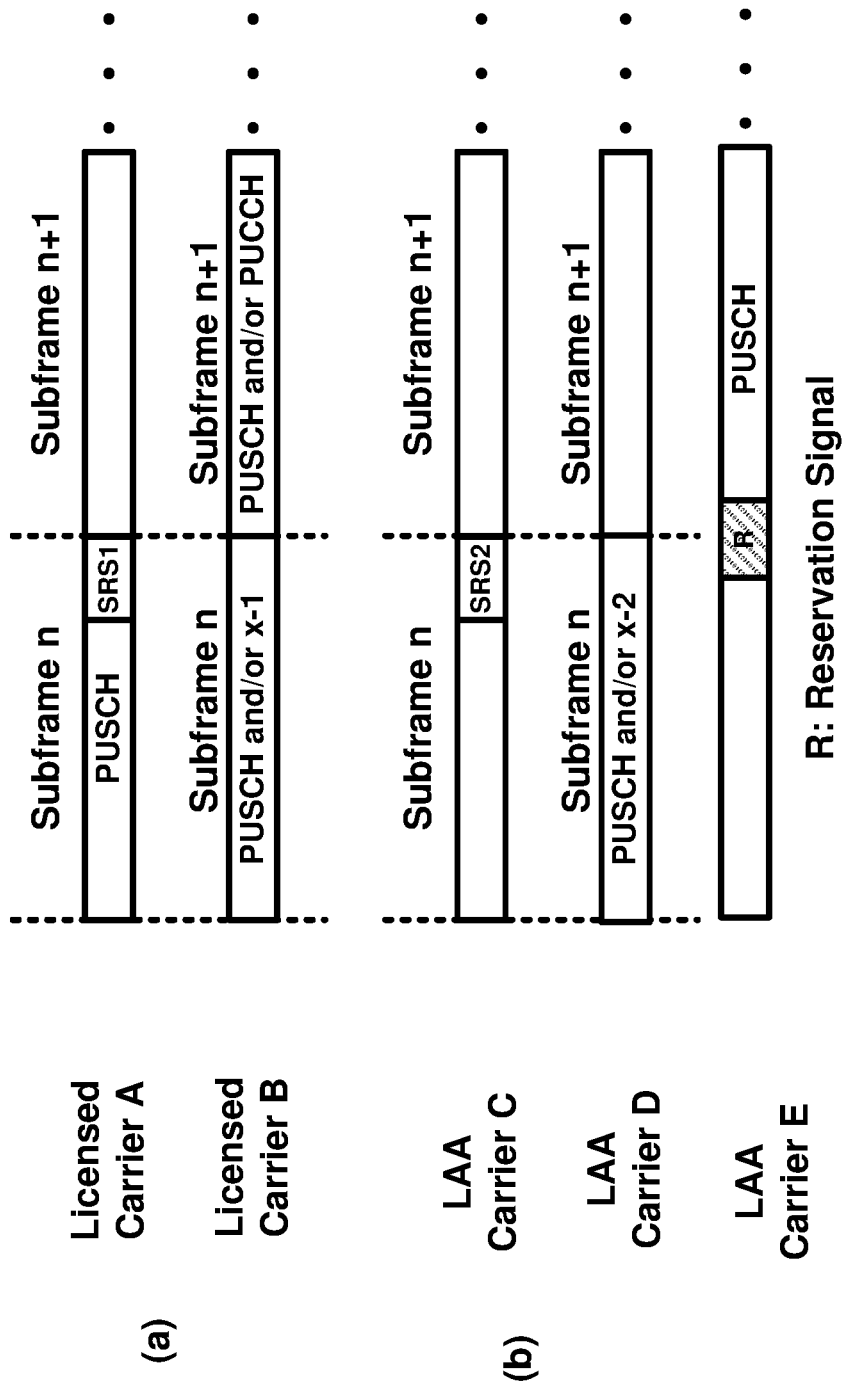
FIG. 13 is an example diagram depicting a plurality of cells as per an aspect of an embodiment of the present disclosure.

As shown in example FIG. 11 and FIG. 13, R signal may be transmitted in parallel with SRS, PUSCH, PUCCH, and or other R signals. The example figure shows one R signals. In an example scenario, R signals may be transmitted in parallel in more than one LAA cell. Mechanisms need to be implemented to determine R transmit signal power and other signal powers when the UE is power limited in subframe n.

Duration of reservation signals in subframe n−1 may depend on UE configuration, maximum allowed reservation signal duration, and/or on the LBT process and when LBT indicates a clear channel. In an example, the duration of R signals in subframe n may be x symbols (e.g. x=1, 2, 3) or x micro-seconds (e.g. x=30, 40, 80 micro seconds).

In an example, when the UE is power limited, the power control mechanism may determine the transmit power for the entire subframe n regardless of the length of the R duration in subframe n (the overlap of R signals and subframe n). Power control mechanism and/or adjustments may be applied to the signals transmitted during the subframe. A power priority mechanism may be considered to adjust and/or drop one or more signals so that the total transmit power is below a maximum allowed transmission power.

In an example, when the UE is power limited, the power control mechanism may determine the transmit power for the entire subframe when the duration of R signal in subframe n is above certain threshold (e.g. 1 symbol, 20 microseconds, etc). In an example, when the duration of R signals in subframe n is below certain threshold (e.g. 1 symbol, 20 microseconds, etc) the UE may calculate the subframe transmit power for signals in subframe n without considering the power required for transmission of the reservation signal. The UE may adjust the transmit power or one or more signals during the overlap duration with the R signal(s) in subframe n in a way that the total transmit power of the UE does not exceed a maximum power during any overlap period. UE may adjust the transmit power during the overlap period of signals in subframe n and the R signals in subframe n so that the total transmit power does not exceed the maximum transmit power during the transmission of R signals in subframe n. In addition, the UE may adjust the transmit power of one or more signals in other carriers (PUSCH, PUCCH, SRS, and/or other R signals) during the subframe so that the total transmit power does not exceed during the entire subframe. For example, in FIG. 11 and FIG. 13, the UE may adjust the transmit powers in carrier A, B, and D during the entire subframe so that total power does not exceed the maximum power. Then when the overlap duration with R signal in subframe n is below a threshold, the UE may adjust one or more signal transmit powers (e.g. according to a power priority) during the R overlap period so that the total power during the overlap period does not exceed a threshold. This mechanism may be applied when one or more R signals are transmitted over one or more cells. In an example, this mechanism may be applied separately to each of the one or more R signals.

In an example implementation, when the reservation signal is transmitted in more than one subframe, for example as shown in FIG. 13, a transmit power may be calculated for R signal. Then the transmit power of R signals may be separately determined in subframe n and n+1 based on maximum power requirements and power priorities, and based on limitations on transmit power in subframe n and n+1. For example, the R signal power may need to be adjusted in subframe n due to power limitations in subframe n, and R signal power may not need to be adjusted in subframe n+1 (since power is not limited during the subframe n+1). Power limitations in subframe n and n+1 varies, because different signals are transmitted on cells in subframe n compared with subframe n+1.

In an example, R signal may be transmitted with a first power in subframe n. R signal may be transmitted with a second power in subframe n+1. R signal may be adjusted based on power priorities and power limitations in each of the subframe n and n+1. In an example, the R signal power may be adjusted (scaled down) in subframe n to meet the maximum transmit power requirements. The R signal power may not be adjusted (scaled down) in subframe n+1, since total transmit power is below the maximum transmit power. Transmit power control mechanisms may be separately applied to signals (e.g. R signals) transmitted in subframe n and subframe n+1.

In an example implementation, when the reservation signal is transmitted in more than one subframe, for example as shown in FIG. 13, a transmit power may be calculated for R signal. Then the transmit power of R signals may be separately determined in subframe n and n+1, based on limitations on transmit power in subframe n and n+1. For example, the R signal power may need to be adjusted in subframe n due to power limitations, but do not need to be adjusted in subframe n+1 (since power is not limited during the subframe n+1). The transmit power of the R signal may remain the same during the R signal transmission duration (not including the transient period). The R signal may be transmitted with the same power during the subframe n and n+1. In an example, the R signal power during subframe n and n+1 may be determined based on the lower power value of a first power determined in subframe n and a second power determined for subframe n+1.

In an example embodiment different power priorities may be assigned to transmission power of different signals. In an example, R signals may be assigned the priority of the following signal. Transmission power priorities may be determined according to the following:

PRACH>PUCCH>PUSCH with UCI>PUSCH>SRS

For example, when the R signals are transmitted for reserving the channel for transmission of PUSCH, the reservation signal may be allocated the same priority of PUSCH transmission power.

For example, when R signals are transmitted prior to PUSCH signals:

$$\sum_{c \neq j} w(i) \cdot \hat{P}_{PUSCH,c}(i) + \sum v(i) P\_R \leq (\hat{P}_{CMAX}(i) - \hat{P}_{PUCCH}(i) - \hat{P}_{PUSCH,j}(i))$$

or $$\sum_{c \neq j} w(i) \cdot (\hat{P}_{PUSCH,c}(i) + P\_R) \leq (\hat{P}_{CMAX}(i) - \hat{P}_{PUCCH}(i) - \hat{P}_{PUSCH,j}(i))$$

W and v are scaling factor smaller than or equal to 1. In an example embodiment, when there is not enough power to transmit R signals, the scaling factor for the R signal transmission power may be assigned to zero. In an example implementation, if there is not enough power to transmit an R signal according to a power priority mechanism (e.g. one of the above implementations), R signal may be dropped in subframe n. In an example implementation, one or more R signals may be dropped and one or more R signals may be transmitted according to the above example priority mechanisms so that the total transmit power is below a maximum total transmit power.

In an example, when the R signals are transmitted for reserving the channel for transmission of SRS, the reservation signal may be allocated the same priority of SRS transmission power. In an example embodiment, SRS signals and the preceding R signal may be dropped when a total calculated transmit power exceeds a maximum transmit power.

In an example, when the R signals are transmitted for reserving the channel for transmission of PRACH, the reservation signal may be allocated the same priority of PRACH transmission power.

According to various embodiments, a device such as, for example, a wireless device, a base station and/or the like, may comprise one or more processors and memory. The memory may store instructions that, when executed by the one or more processors, cause the device to perform a series of actions. Embodiments of example actions are illustrated in the accompanying figures and specification.

Figure 15:
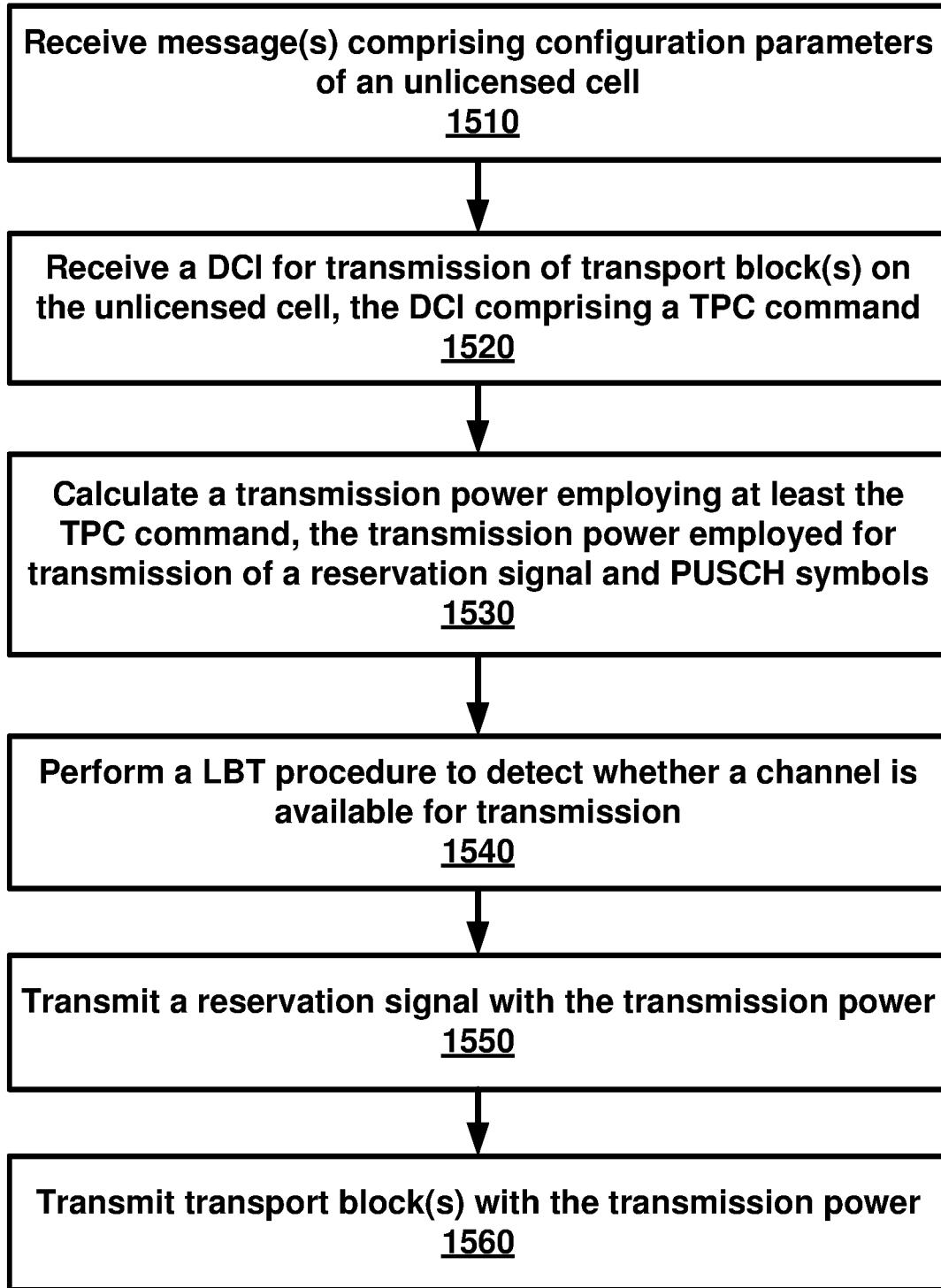
FIG. 15 is an example flow chart as per an aspect of an embodiment of the present disclosure.

FIG. 15 is an example flow diagram as per an aspect of an embodiment of the present disclosure. At 1510, a wireless device may receive one or more messages. The one or more messages may comprise configuration parameters of an unlicensed cell. A downlink control information (DCI) may be received at 1520. The DCI may be for transmission of one or more transport blocks on the unlicensed cell. The DCI may comprise a transmit power control (TPC) command. At 1530, a transmission power may be calculated employing at least the TPC command. The transmission power may be employed for transmission of a reservation signal and a plurality of PUSCH symbols. A listen-before-talk (LBT) procedure may be performed at 1540 to detect whether a channel is available for transmission. At 1550, the wireless device may transmit, in response to the LBT procedure indicating that the channel is available and via a first plurality of resource blocks (RBs) and until a physical uplink shared channel (PUSCH) starting symbol, a reservation signal with the transmission power. At 1560, the one or more transport blocks with the transmission power may be transmitted via the first plurality of RBs starting at the PUSCH starting symbol.

According to an embodiment, the reservation signal may be transmitted only at a beginning subframe of an uplink burst comprising one or more subframes. The reservation signal may, for example, have a predetermined format. According to an embodiment, an indication configuring a starting time for the reservation signal may be received from a base station. According to an embodiment, an indication configuring the PUSCH starting symbol may be received from a base station. According to an embodiment, the one or more messages may comprise one or more uplink power control parameters. According to an embodiment, the calculation of the transmission power may further comprise adjusting a power of the reservation signal and the plurality of PUSCH symbols with a same adjusting factor.

Figure 16:
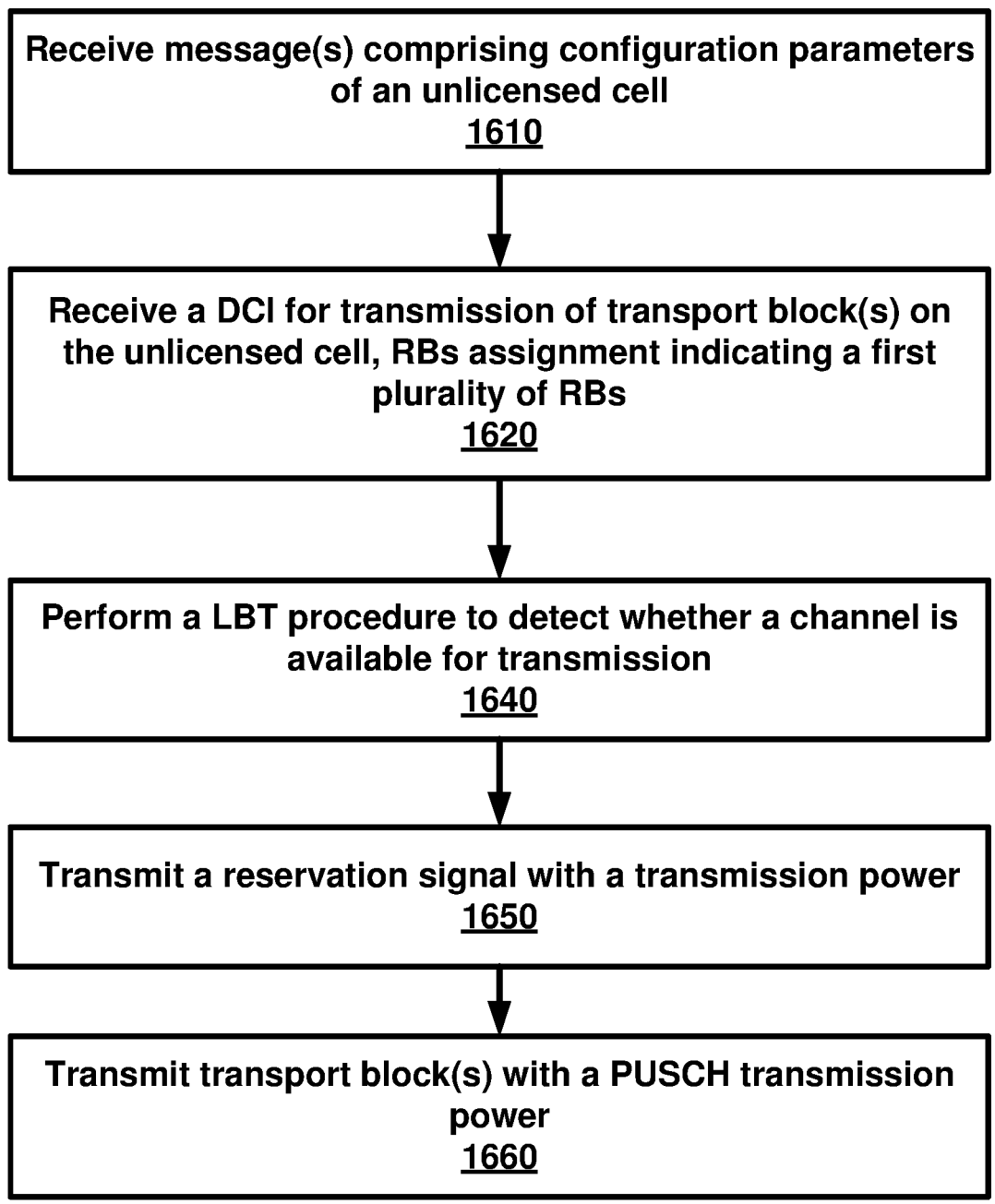
FIG. 16 is an example flow chart as per an aspect of an embodiment of the present disclosure.

FIG. 16 is an example flow diagram as per an aspect of an embodiment of the present disclosure. A wireless device may receive one or more messages comprising configuration parameters of an unlicensed cell at 1610. A DCI may be received at 1620 for transmission of one or more transport blocks on the unlicensed cell. The DCI may comprise a RBs assignment indicating a first plurality of resource blocks (RBs). An LBT procedure may be performed at 1630 to detect whether a channel is available for transmission. The wireless device may transmit at 1650, in response to the LBT procedure indicating that the channel is available and via the first plurality of RBs and until a physical uplink shared channel (PUSCH) starting symbol, a reservation signal with a reservation signal transmission power. At 1660, the wireless device may transmit, via the first plurality of RBs and starting at the PUSCH starting symbol, the one or more transport blocks with a PUSCH transmission power. The reservation signal transmission power may be equal to the PUSCH transmission power.

According to an embodiment, the reservation signal may be transmitted only at a beginning subframe of an uplink burst comprising one or more subframes. According to an embodiment, the reservation signal may have a predetermined format. According to an embodiment, the wireless device may further comprise receiving, from a base station, an indication configuring a starting time for the reservation signal. According to an embodiment, the wireless device may further receive, from a base station, an indication configuring the PUSCH starting symbol. The one or more messages comprise, for example, one or more uplink power control parameters.

Figure 17:
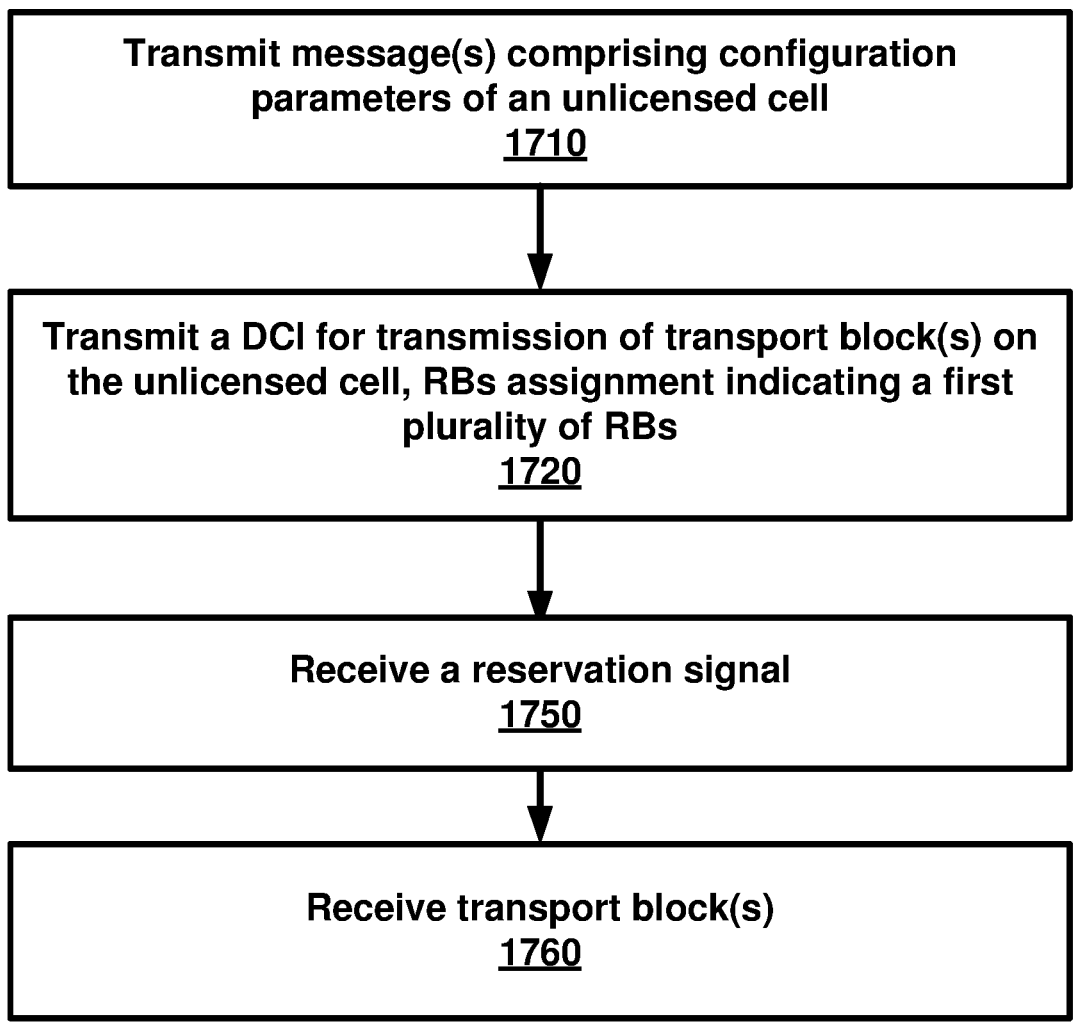
FIG. 17 is an example flow chart as per an aspect of an embodiment of the present disclosure.

FIG. 17 is an example flow diagram as per an aspect of an embodiment of the present disclosure. A base station may receive one or more messages comprising configuration parameters of an unlicensed cell at 1710. The base station may transmit to a wireless device a DCI at 1720 for transmission of one or more transport blocks on the unlicensed cell. The DCI may comprise a RBs assignment indicating a first plurality of resource blocks (RBs). The base station may receive from the wireless device a reservation signal at 1750. At 1760, the base station may receive from the wireless device the one or more transport blocks via the first plurality of RBs and starting at the PUSCH starting symbol.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving, by a wireless device, a downlink control information indicating:
a transmit power control (TPC) command; and
first resource blocks (RBs);
determining, based on the TPC command, a transmission power used for transmission of:
an uplink signal; and
one or more transport blocks; and
transmitting, based on a listen-before-talk (LBT) procedure, with the transmission power and via subcarriers of the first RBs:
the uplink signal until a physical uplink shared channel (PUSCH) starting symbol; and
the one or more transport blocks starting at the PUSCH starting symbol.

2. The method of claim 1, wherein the uplink signal is transmitted at a beginning subframe of an uplink burst during one or more subframes.

3. The method of claim 2, further comprising receiving, from a base station, an indication configuring a starting time for the uplink signal.

4. The method of claim 3, wherein the uplink signal has a predetermined format.

5. The method of claim 1, wherein the uplink signal has a predetermined format.

6. The method of claim 1, further comprising receiving, from a base station, an indication configuring a starting time for the uplink signal.

7. The method of claim 1, wherein the downlink control information (DCI) further indicates the PUSCH starting symbol.

8. The method of claim 1, further comprising receiving one or more messages comprising configuration parameters of an unlicensed cell, wherein the one or more messages comprise one or more uplink power control parameters of the unlicensed cell for transmission of the one or more transport blocks.

9. The method of claim 1, wherein the determining the transmission power further comprises adjusting a power of the uplink signal and the one or more transport blocks with a same adjusting factor.

10. The method of claim 1, wherein the uplink signal is transmitted to reserve a channel.

11. A wireless device comprising:
one or more processors; and
memory storing instructions that, when executed by the one or more processors, cause the wireless device to:
receive a downlink control information indicating:
a transmit power control (TPC) command; and
first resource blocks (RBs);
determine, based on the TPC command, a transmission power used for transmission of:
an uplink signal; and
one or more transport blocks; and
transmit, based on a listen-before-talk (LBT) procedure, with the transmission power and via subcarriers of the first RBs:
the uplink signal until a physical uplink shared channel (PUSCH) starting symbol; and
the one or more transport blocks starting at the PUSCH starting symbol.

12. The wireless device of claim 11, wherein the uplink signal is transmitted at a beginning subframe of an uplink burst during one or more subframes.

13. The wireless device of claim 12, further comprising receiving, from a base station, an indication configuring a starting time for the uplink signal.

14. The wireless device of claim 13, wherein the uplink signal has a predetermined format.

15. The wireless device of claim 11, wherein the uplink signal has a predetermined format.

16. The wireless device of claim 11, wherein the instructions, when executed by the one or more processors, further cause the wireless device to receive, from a base station, an indication configuring a starting time for the uplink signal.

17. The wireless device of claim 11, wherein the downlink control information (DCI) further indicates the PUSCH starting symbol.

18. The wireless device of claim 11, wherein the instructions, when executed by the one or more processors, further cause the wireless device to receive one or more messages comprising configuration parameters of an unlicensed cell, wherein the one or more messages comprise one or more uplink power control parameters of the unlicensed cell for transmission of the one or more transport blocks.

19. The wireless device of claim 11, wherein the determination of the transmission power further comprises adjusting a power of the uplink signal and the one or more transport blocks with a same adjusting factor.

20. The wireless device of claim 11, wherein the uplink signal is transmitted to reserve a channel.

* * * * *